United States Patent
Sugarev

(10) Patent No.: US 12,381,732 B2
(45) Date of Patent: Aug. 5, 2025

(54) SINGLE-USE AUTHORIZATION CODES IN SELF-CONTAINED FORMAT

(71) Applicant: SAP SE, Walldorf (DE)

(72) Inventor: Radoslav Ivanov Sugarev, Petrich (BG)

(73) Assignee: SAP SE, Walldorf (DE)

( * ) Notice: Subject to any disclaimer, the term of this patent is extended or adjusted under 35 U.S.C. 154(b) by 113 days.

(21) Appl. No.: 18/209,011

(22) Filed: Jun. 13, 2023

(65) Prior Publication Data
US 2023/0353367 A1  Nov. 2, 2023

Related U.S. Application Data

(63) Continuation of application No. 17/158,509, filed on Jan. 26, 2021, now Pat. No. 11,757,645.

(51) Int. Cl.
*H04L 29/06* (2006.01)
*H04L 9/08* (2006.01)
(Continued)

(52) U.S. Cl.
CPC ............ *H04L 9/3228* (2013.01); *H04L 9/085* (2013.01); *H04L 9/3073* (2013.01); *H04L 9/3213* (2013.01)

(58) Field of Classification Search
None
See application file for complete search history.

(56) References Cited

U.S. PATENT DOCUMENTS

| 6,959,393 B2 | 10/2005 | Hollis et al. |
| 7,778,931 B2 | 8/2010 | Rits |

(Continued)

FOREIGN PATENT DOCUMENTS

| CN | 104255007 | 12/2014 |
| CN | 108322472 | 7/2018 |

(Continued)

OTHER PUBLICATIONS

Office Action in Chinese Appln. No. 202111281843.X, dated Jun. 3, 2023, 18 pages (with English translation).

(Continued)

*Primary Examiner* — Jeffery L Williams
(74) *Attorney, Agent, or Firm* — Fish & Richardson P.C.

(57) ABSTRACT

The present disclosure relates to computer-implemented methods, software, and systems for generating access tokens at an authentication server based on authorization codes. A first authorization server from a set of authorization servers receives a request for authorization of a request to access a resource by a resource owner. The first authorization server validates the request for authorization of the request to generate an authorization code. In response to successful validation of the request for authorization to generate the authorization code, the first authorization server generates a single-use authorization code by signing the generated authorization code with a unique private key. A unique public key is maintained for verifying the signed authorization code. The single-use authorization code is generated in a self-contained format. The single-use authorization code is provided to the client application for generation of an access token by one of the authorization servers from the set of authorization servers.

16 Claims, 8 Drawing Sheets

(51) Int. Cl.
  *H04L 9/30* (2006.01)
  *H04L 9/32* (2006.01)

(56) References Cited

U.S. PATENT DOCUMENTS

| | | | |
|---|---|---|---|
| 8,019,860 | B2 | 9/2011 | Ivanov et al. |
| 8,650,622 | B2 | 2/2014 | Murakami et al. |
| 8,700,899 | B1 | 4/2014 | Juels |
| 9,197,408 | B2 | 11/2015 | Amato |
| 9,256,413 | B2 | 2/2016 | Ivanov et al. |
| 9,344,410 | B1 | 5/2016 | Lin |
| 9,819,672 | B1 | 11/2017 | Machani |
| 9,900,212 | B2 | 2/2018 | Pavlov et al. |
| 10,469,484 | B1 | 11/2019 | Chen et al. |
| 10,887,301 | B1 | 1/2021 | Vera et al. |
| 11,140,146 | B2 * | 10/2021 | Suraparaju .......... H04L 63/0807 |
| 11,349,662 | B2 | 5/2022 | Chang et al. |
| 11,503,012 | B1 * | 11/2022 | Yancey ................ H04L 63/102 |
| 11,503,013 | B2 * | 11/2022 | Bruckner ............. H04L 63/102 |
| 11,546,159 | B2 | 1/2023 | Sugarev |
| 11,563,580 | B2 | 1/2023 | Sugarev |
| 2009/0258631 | A1 | 10/2009 | Forsberg et al. |
| 2013/0007846 | A1 | 1/2013 | Murakami et al. |
| 2015/0163061 | A1 | 6/2015 | Gupta |
| 2015/0348015 | A1 | 12/2015 | Ren et al. |
| 2016/0179494 | A1 | 6/2016 | Pavlov et al. |
| 2017/0085563 | A1 | 3/2017 | Royyuru |
| 2018/0034796 | A1 | 2/2018 | Ross et al. |
| 2018/0075231 | A1 * | 3/2018 | Subramanian ...... H04L 63/0807 |
| 2018/0077144 | A1 * | 3/2018 | Gangawane .......... H04L 63/102 |
| 2018/0167367 | A1 | 6/2018 | John et al. |
| 2019/0251241 | A1 | 8/2019 | Bykampadi et al. |
| 2019/0306138 | A1 | 10/2019 | Carru et al. |
| 2019/0372958 | A1 | 12/2019 | Dunjic et al. |
| 2019/0394042 | A1 | 12/2019 | Peddada |
| 2020/0014681 | A1 | 1/2020 | Sajja et al. |
| 2020/0059466 | A1 | 2/2020 | Jiang et al. |
| 2020/0067711 | A1 | 2/2020 | Abadir et al. |
| 2020/0211002 | A1 | 7/2020 | Steinberg et al. |
| 2020/0213297 | A1 * | 7/2020 | Suraparaju .......... H04L 63/0892 |
| 2021/0037005 | A1 * | 2/2021 | Ghosh .................. H04L 63/102 |
| 2021/0258299 | A1 * | 8/2021 | Bruckner ............. H04L 63/102 |
| 2021/0288808 | A1 | 9/2021 | Bahety |
| 2021/0336791 | A1 | 10/2021 | Choi et al. |
| 2022/0094547 | A1 | 3/2022 | Duchastel et al. |
| 2022/0138306 | A1 | 5/2022 | Theodor et al. |
| 2022/0232003 | A1 | 7/2022 | Smolny et al. |
| 2022/0239491 | A1 * | 7/2022 | Sugarev ................ H04L 63/126 |
| 2022/0377064 | A1 | 11/2022 | Raj |
| 2022/0383417 | A1 | 12/2022 | Cummings |
| 2023/0138368 | A1 | 5/2023 | Sugarev |
| 2023/0146453 | A1 | 5/2023 | Wang et al. |
| 2023/0353367 | A1 * | 11/2023 | Sugarev ............. G06Q 20/3829 |
| 2024/0007473 | A1 * | 1/2024 | Gjermshus ............ H04L 63/102 |

FOREIGN PATENT DOCUMENTS

| | | |
|---|---|---|
| CN | 108463982 | 8/2018 |
| CN | 111131301 | 5/2020 |
| EP | 3422630 | 1/2019 |

OTHER PUBLICATIONS

Faynberg et al., "On dynamic access control in Web 2.0 and beyond: Trends and technologies." Bell Labs Technical Journal 16.2, Sep. 2011, 199-218, 20 pages.

Hardt, "The OAuth 2.0 Authorization Framework", Oct. 2012, [retrieved on Jan. 27, 2021], retrieved from: URL <https://www.rfc-editor.org/info/rfc6749>, 76 pages.

Jones et al., "JSON Web Signature (JWS)", May 2015, [retrieved on Jan. 27, 2021], retrieved from: URL <https://www.rfc-editor.org/info/rfc7515>, 59 pages.

Jones et al., "JSON Web Token (JWT) Profile for OAuth 2.0 Client Authentication and Authorization Grants", May 2015, [retrieved on Jan. 27, 2021], retrieved from: URL <https://www.rfc-editor.org/info/rfc7523>, 12 pages.

Jones et al., "JSON Web Token (JWT)", May 2015, [retrieved on Jan. 27, 2021], retrieved from: URL <https://www.rfc-editor.org/info/rfc7519>, 30 pages.

Jwt.io [online], "Introduction to JSON Web Tokens" Oct. 2015, [retrieved on Jan. 27, 2021], retrieved from: URL <https://jwt.io/introduction/>, 11 pages.

Raft.github.io [online], "The Raft Consensus Algorithm" Sep. 2015, [retrieved on Jan. 27, 2021], retrieved from: URL <https://raft.github.io/>, 11 pages.

Extended European Search Report issued in European Application No. 21205149.4 on Apr. 7, 2022, 7 pages.

U.S. Appl. No. 17/096,605, filed Nov. 12, 2020, Sugarev.

Non-Final Office Action in U.S. Appl. No. 18/148,935, mailed on Feb. 9, 2024, 21 pages.

* cited by examiner

SINGLE-USE AUTHORIZATION CODES IN SELF-CONTAINED FORMAT

CLAIM OF PRIORITY

This application claims priority under 35 USC § 120 to U.S. patent application Ser. No. 17/158,509, filed on Jan. 26, 2021, entitled "SINGLE-USE AUTHORIZATION CODES IN SELF-CONTAINED FORMAT" the entire contents of which are hereby incorporated by reference.

TECHNICAL FIELD

The present disclosure relates to computer-implemented methods, software, and systems for secure data processing.

BACKGROUND

Software applications can provide services and access to resources. Resources may be restricted to a limited number of users based on user rights and roles. Tokens can be used to authenticate requests received at software applications to gain access to electronically restricted resources. Tokens can be used in addition or as an alternative to passwords, and can be verified to determine whether to provide or otherwise allow access or to perform a certain operation. When a user requests access to a resource, an access token may be provided by the user to be authenticated prior to accessing the resource. The access token can be validated to determine whether the request can be processed and whether the request is valid. To generate an access token by an authorization server, authorization codes can be exchanged as tokens to verify authenticity of the requestor, thereby allowing the generation of the access token.

SUMMARY

The present disclosure involves systems, software, and computer implemented methods for generating authorization codes as single-use code in a self-contained token format.

One example method may include operations such as receiving, at a first authorization server from a set of authorization servers of an identity provider, a request for authorization of a request to access a resource by a resource owner, wherein the request is received through a user agent that sends a redirect request to a client application to be redirected to the first authorization server; validating, at the first authorization server, the request for authorization the request to generate an authorization code; in response to successful validation of the request for authorization to generate the authorization code, generating, at the first authorization server, a single-use authorization code by signing the generated authorization code with a unique private key, and wherein a unique public key is maintained for verifying the signed authorization code, wherein the single-use authorization code is generated in a self-contained format; and providing the single-use authorization code to the client application for generation of an access token by one of the authorization servers from the set of authorization servers, wherein the access token is for access authorization to the resource from the client application, wherein the access token is to be generated based on a validation performed at one or more of the authorization servers of the set of authorization servers of the identity providers and based on the unique public key, wherein in response to invoking the unique public key for validating the single-use authorization code, the unique public key is dynamically deleted. Other implementations of this aspect include corresponding systems, apparatus, and computer programs, configured to perform the actions of the methods, encoded on computer storage devices.

Implementations can optionally include that the unique private key is stored in-memory at the first authorization server.

In some instances, the unique public key may be stored in-memory at an authorization server from the plurality of authorization servers that is defined as a leader server in an hierarchical organization of the set of authorization servers of the identity provider.

In some instances, the unique private key may not be maintained in data storage associated with the identity provider.

In some instances, the unique public key may be stored at a shared key store accessible by the plurality authorization servers of the identity provider, wherein the shared key store is not shared external to the plurality of authorization servers of the identity provider.

In some instances, the example method may further include: generating, at the first authorization server, a unique key pair including the unique public key and the unique private key, wherein the unique key pair is generated in association with the authorization code; and in response to generation of the single-use authorization code, dynamically deleting the unique private key.

In some instances, the authorization code can be in a JSON Web Token format.

In some instances, the example method may include that in response to receiving an access token generation request based on the single-use authorization code at the first authorization server, validation of the single-use authorization code based on the unique public key is performed, and the unique public key can be dynamically deleted.

In some instances, the access token generation request can be directed to an instance of an authorization server that is associated with the generation of the single-use authorization code. The first authorization server can be determined as the one relevant for the request and for directing the access token generation requests based on a generated session consistency identifier. In some of those instances, the session consistency identifier can be generated at a load balancer implemented at the identity provider, the load balancer dispatches requests including requests for generating authorization codes and access token.

In some instances, the request for authorization of the request to access the resource by the resource owner can be a redirected request from the client application. In some instances, the client application can initially receive a request from the resource owner through the user agent for the resource.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description, the drawings, and the claims.

DETAILED DESCRIPTION

Figure 1:
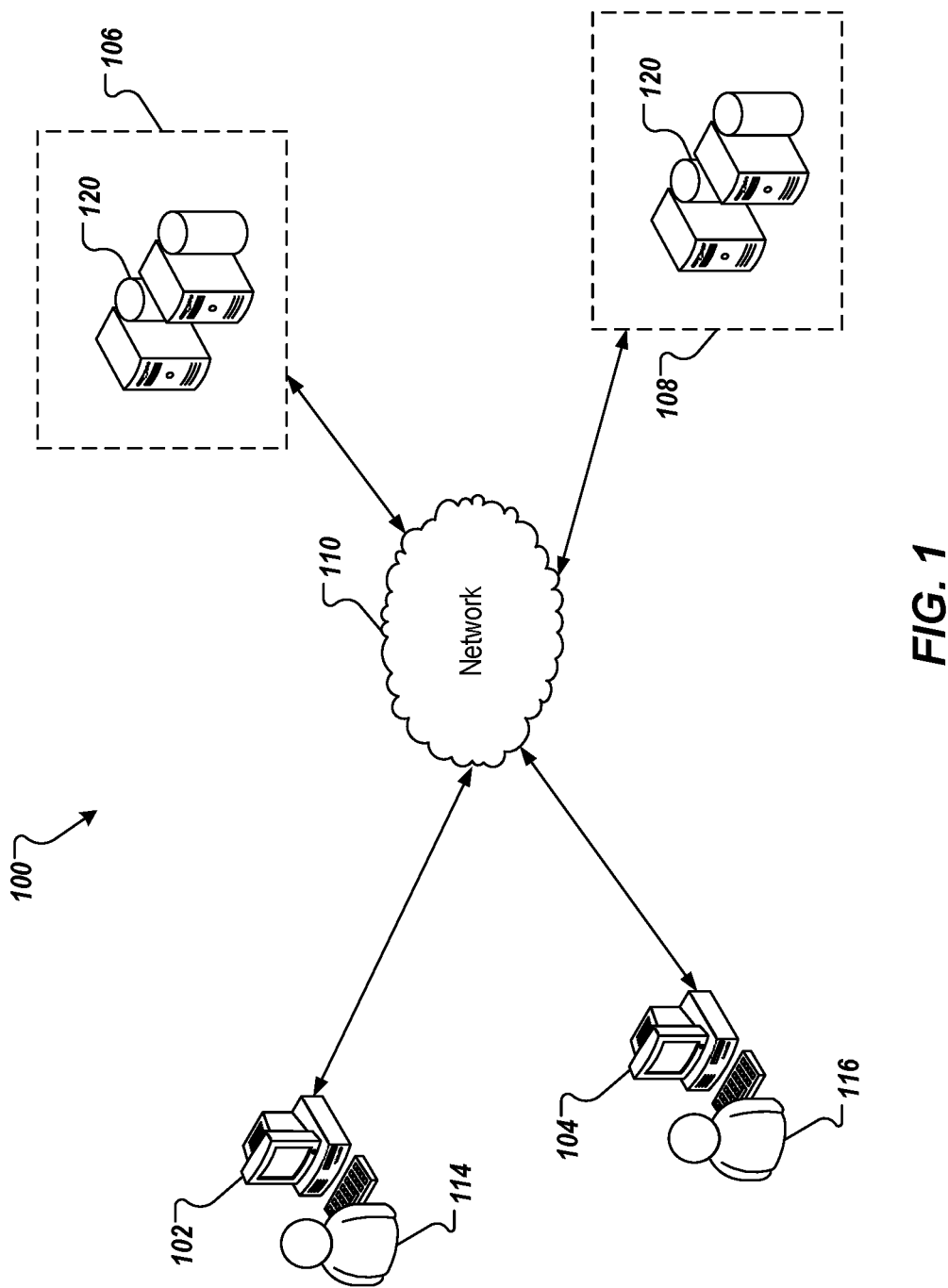
FIG. 1 illustrates an example computer system architecture for managing authorization requests in accordance with the implementations of the present disclosure.

The present disclosure describes various tools and techniques for generating access tokens at an authentication server based on authorization codes. The authorization server may be a single server of a security provider, or may be one instance of multiple authorization server instances of a security provider. Authorization codes can be provided to a requestor, such as a resource owner, to request issuance of a security token that can be used for authorization of communication between a client and a server application. In some instances, authorization codes can be generated as self-contained tokens that can be used only once in a secure manner based on unique key pairs managed within the authorization server environment. Generated authorization codes can be used for issuance of security tokens including the authorization codes, such as access tokens, refresh tokens, and other suitable tokens or codes that can be issued by an authorization server.

In some instances, client applications can communicate with application servers and request data and resources. The communication between the applications can be a secure communication where the client application authenticates at the application server, for example, by providing identity data of the requestor, for example, a user or a client application, among others.

In some instances, when a client application requests resources from an application server, the client application can provide an access token to authorize the request. If the request can be successfully authorized based on validation of the access token, the resources can be successful provided. The client application can send requests to the application server based on received requests from a user, for example, through a user agent application.

In some instances, to acquire an access token that can be used for authorized access to resources of a client application from an application server, the client application can communicate with an authorization server to request the access token. The initiation to generate an access token can be triggered from a user via a user agent application (e.g., a browser application).

In some instances, a resource owner (e.g., a user of a user agent application) can request to access a resource through a client application. To authorize the access, the client application can redirect the user to an authorization server. The authorization server can process the authorization request incoming from the user by issuing an authorization code as a temporary code that can be used by the client application for subsequent authorization requests at the authorization server to issue an access token. The client application can acquire the authorization code that is provided from the authorization server for the user. The client application can use the authorization code to request issuance of an access token by the authorization server.

In some instances, an access token can be generated in a given format to encode security information for the identity of a user and/or an application. For example, an access token can be a software token that can be exchanged between communicating parties (e.g., a client application and a server application), and can be validated based on public key validation of an authorized security service. The security token can be provided together with a request that is sent from a client to a server to authenticate the request and the user. For example, the security token can be an access token for accessing an application, such as a JavaScript Object Notation (JSON) Web Token (JWT).

In some instances, a user uses a web browser agent to request a resource through a client application. When the user requests resources through the client application, the client application needs to provide the identity of the user requesting the resources. Identity information can be sent as part of or separate from the request. The identification of the identity of the requestor may be provided through sending an access token with a request or in a separate authorization interaction for gaining authorized access to resources.

In some instances, an access token can include information that facilitates sharing of identity and security information in an environment associated with multiple entities and domains. For example, a client application can be provided with an access token issued by a security authorization server for authorizing the client application at the server application in response to requests received from the user agent.

In some instances, to authorize a request for resources, the user agent may authorize its request with an authorization server and generate an access token that can be provided to the client to be used for verification(s). In some instances, the access token can be generated as part of responding to a request to provide access to resources received from a user agent to a client. In some other instances, the access token can be generated as a separate process, and the generated access token can be used for subsequent requests for resources received at the client from the user agent.

In some instances, as part of the generation of the access token by the authorization server, a user can authenticate with the authorization server through the user agent, and can establish whether the request to access the resources is to be granted or denied. If access to the resources is to be granted, the authorization server can redirect the user agent to the client application and provide an authorization code that can be used by the client application to issue an access token at the authorization server. The authorization code can be used to exchange information about the identity of the user between the client and the authorization server when generating the access token.

In some instances, when an access token is requested for generation by a client application in response to a request from a user agent, an authorization code can be generated at one of multiple authorization servers of an identity provider. The authorization code can be used to request an access token to be issued at the authorization server environment. The authorization code can be obtained by the requestor (i.e., the user agent) from the authorization server and exchanged later on for an access token or other security token (e.g., refresh token for issuance of new access tokens). In some implementations, the authorization code can be a temporary code that once generated can be used only a single time by the client and the user agent to generate an access token or another security token.

In some instances, the authorization code can be generated by one of multiple authorization servers based on a unique key-pair including a private and a public key. In some instances, the private key of the unique key-pair can be used for the generation of the authorization code, and the public key can be used for the verification of the authorization code when provided for generation of an access token.

In some instances, the authorization code can be issued after a user, for example, a resource owner, authenticates and grants authorization for the requested resource at the authorization server. Once an authorization code is generated and provided to the client, the client can provide it to the authorization server, where the authorization server can map the authorization code with a respective user and generate the access token.

In some instances, the authorization code can be generated to include data associated with the authenticated user, for example, first name, last name, email, unique identifier, among other user identifiable information.

In some instances, the generated authorization code may be generated in a self-contained format, for example, in JWT format. By generating an authorization code in a self-contained format, the authorization code can be validated without the need for the authorization codes to be stored in a database. If authorization codes are stored in a database, the authorization codes can be validated by querying the database. However, such maintenance of authorization codes requires resources to manage and store the authorization codes. Thus, by generating authorization codes that are in a self-contained format, validation can be performed without querying a database to validate the code.

In some instances, authorization codes have to have limited usage for generation of access tokens. In those instances, once an authorization code is used to request and generate an access token, a second request based on the same authorization code should not be valid. Thus, the authorization codes can be generated as signed versions of self-contained tokens that can be validated only once. Signed version of self-contained tokens can be validated based on public keys of the issuing authority. Thus, to limit validation of authorization codes in signed self-contained form, validity life of validation public keys can be limited to a single use or invocation.

In some instances, a signed version of an authorization code can be generated at an authorization server. In some instances, the signed version of the authorization code can be a self-contained code that can be used for generation of an access token. The signed version has to be validated by the receiving authorization server to be able to access the authorization code content and validate the request for generating the access token. The signed version of the authorization code may be based on a public-private key pair that can be a unique key pair generated and managed by the security identity provider. The unique key pair may be managed to allow for single signing and validation operations. In some instances, the unique key pair can be deleted in response to an invocation of the public key of the unique pair to validate a signed authorization code. In some other instances, the unique key pair that is used by the authorization server may not be persisted in a database, and may be stored only in-memory. In some other instances, each of the keys can be deleted automatically upon use for a corresponding signing or validation operation.

In some instances, the unique key pair or only a public key of the pair can be stored at an in-memory storage 234 of the "Authorization Server Instance A" 235.

In some instances, a first public-private key pair can be used for encrypting a first authorization code, and in response to requesting generation of an access token based on this first authorization code, the public key of the first public-private key pair can be fetched. In response to the use of the public key, at least the public key of the key pair can be deleted to exclude the use of the key pair for validation of a subsequent request for an access token with the same first authorization code. In some more instances, if a subsequent access token is requested based on a second authorization code, a second public-private key pair can be used for encrypting the second authorization code, where the second pair is different from the first pair. The public keys of the first key pair is not persisted once used, to ensure that a subsequent request to an already executed request to acquire an access token based a signed first authorization code based on the first private is not going to verified as the public key would not be possible to be located and invoked. In some other instances, a subsequent request based on an encrypted first authorized code according to the second private key can be verified based on determining whether a second public key can be located and invoked for use during the verification.

In some instances, and in accordance with the implementations of the present disclosure, the generation of authorization codes, access tokens, and other type of security tokens, can be performed by one or multiple instances of one or more authorization servers of an identity provider. Thus, when requests for generation of an authorization code, an access token, or other suitable examples, is received, one of the authorization server instances can handle processing the request and, if necessary, communicate with another authorization server instance from the authorization server instances to synchronize information about previous security code generations. For example, one authorization server may handle generation of an authorization code, while a second authorization server may process a generation of an access token based on an already-issued authorization code. In that example, the two authorization servers may synchronize to validate the requests and to provide a safe access token generation based on authorization codes that are self-contained for validation and limited for use only once based on unique key pairs. In some instances, the authorization servers associated with the token/code generation can manage the maintenance of unique key pairs to support single-use of the authorization codes that are in self-contained form.

FIG. 1 depicts an example architecture 100 in accordance with implementations of the present disclosure. In the depicted example, the example architecture 100 includes a client device 102, a client device 104, a network 110, a platform environment 106, and a platform environment 108. The platform environment 106 and the platform environment 108 may be cloud environment. The platform environment 106 and the platform environment 108 may include corresponding one or more server devices and databases (e.g., processors, memory). In the depicted example, a user 114 interacts with the client device 102, and a user 116 interacts with the client device 104.

In some examples, the client device 102 and/or the client device 104 can communicate with the platform environment 106 and/or platform environment 108 over the network 110. The client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the platform environment 106 includes at least one server and at least one data store 120. In the example of FIG. 1, the platform environment 106 is intended to represent various forms of servers including, but not limited to a web server, an application server, a proxy server, a network server, and/or a server pool. In general, server systems accept requests for application services and provides such services to any number of client devices (e.g., the client device 102 over the network 110) and other service requests, as appropriate.

In some instances, the platform environments 106 and 108 may host one or more client applications, application servers, and authorization servers to support execution of secure requests between the client applications and the application server. In some instances, the user 114 or 116 may access a client application through the network 110. The client application may be communicatively coupled with an application server. The application server may include application logic implemented to provide services and resources to end users. To respond to requests received from the client application, the application server performs identity verification for the received requests and validates the request to determine whether the requests is associated with an authorized user. In some instances, the client application may send an access token to the application server to authenticate the request. The access token can be generated for the client application by an authorization server, which may be separate and unrelated to the application server, in some cases. In some instances, the access token can be generated based on a previously-issued authorization code for the user requesting the resource from the authorization server.

In some instances, the generation of security tokens can include generation of access tokens, authorization codes, among other types of codes that can be validated to determine authorization rights. In some instances, the generation of security tokens can be performed at an identity provider authorization environment that includes one or multiple authorization servers as different end-points, where those authorization servers or instances thereof can be called to handle requests for generation of security tokens.

In some instances, authorization codes can be generated by authorization servers in a self-contained format as discussed above. Thus, an authorization code can be validated when generating an access token without querying a database and based on the content in the authorization code. The authorization code may be generated with a given validity period, and may be defined as limited to a single-use for generating one access token or another security token. In some instances, the authorization codes can be generated by an authorization server in an encrypted self-contained form based on a unique key pair, where one key pair can be used only once. In some instances, the unique key pair can include a encrypting and a decrypting key. When each of these keys of the key pair is used once—for generation of an authorization code and for validating an authorization code—the unique key pair should be deleted and is not persisted. In some instances, the unique key pair may be stored in-memory rather than persisted in a database. The unique key pair can be dynamically deleted in response to an invocation to acquire a public key to verify the authorization code when validating a request for access token generation.

In some instances, when a request for resources is received at a client and the request requires authorization, the request may be handled by one of a plurality of authorization servers defining an authorization environment supporting secure execution of sensitive requests. The plurality of authorization servers can be server instances of a particular authorization server, where the plurality of servers can be organized and managed to handle multiple requests from users in a secure manner. For example, the authorization servers can process requests (1) in a hierarchical manner, where one of the authorization servers is determined as a leading server; (2) in a non-consensus manner, where each authorization server has same rights and role; (3) by using a shared storage; (4) in a load balanced manner; as well as other suitable manners of organizing distribution of processing authorization operations in a secure manner to generate access tokens based on self-contained authorization codes limited to one-time use.

Figure 2:
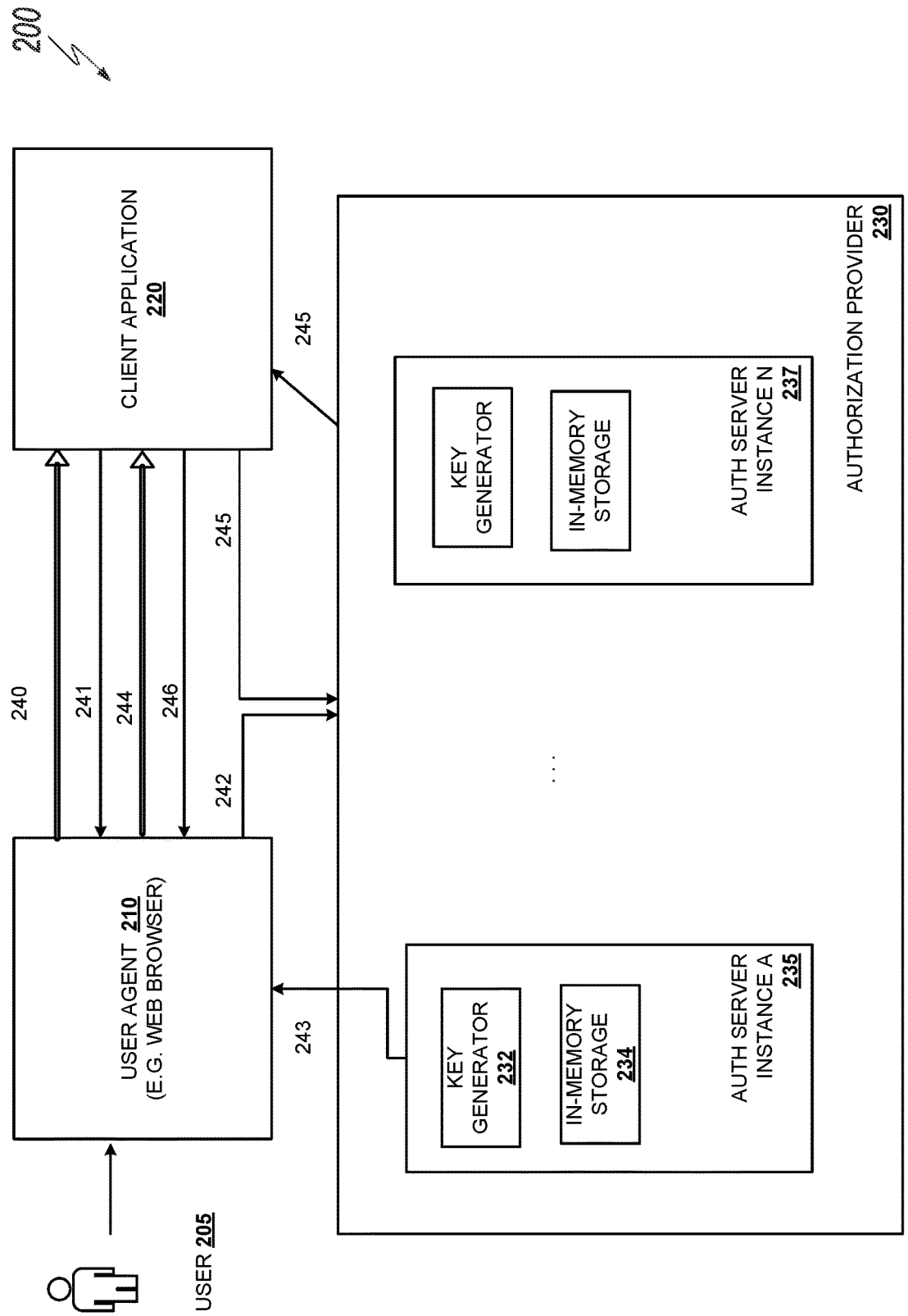
FIG. 2 is a block diagram for an example system for generating an authorization code as a self-contained token for single-use in accordance with implementations of the present disclosure.

FIG. 2 is a block diagram for an example system 200 for generating an authorization code as a self-contained token for single-use in accordance with implementations of the present disclosure. The example system 200 includes a user agent 210, a client application 220, and an authorization provider 230 including multiple instances of authorization servers.

In some instances, the user agent 210 and the client application 220 are communicatively coupled to handle requests for resource and to acquire access tokens that can be used for receiving resources from an application server. When the user agent 210 sends requests to the client application 220 (at 240), these requests are associated with a user 205 of the client application and the application server, where the requests may include identity credentials associated with user 205. The user 205 provides identity credentials that can be used by the client application 220 and an authorization server of the authorization provider 230 to determine whether the request is valid and authorized to be served. In some instances, the user 205 may be a resource owner who requests access to a resource.

In some instances, the authorization provider 230 includes one or more authorization servers—illustrated here as "Authorization Server Instance A" 235 to "Authorization Server Instance N" 237. Multiple server instances of the same type and applying the same authorization protocols and implementations may be organized to handle different requests incoming from user agents (e.g., the user agent 210) and client applications (e.g., the client application 220).

In some instances, the authorization servers at the authorization provider 230 may implement an industry-standard protocol for authorization, such as the OAUTH 2.0.

At 241, when the client application 220 has received a request for resources from the user agent 210, the client application 220 redirects the user agent 210 to an authorization server from the authorization provider 230 to approve the authorization of the resource. In some instances, in response to the redirect 241, the user agent 210 sends an authorization request (at 242) to the authorization provider 230. In some instances, the authorization provider 230 has or includes implemented logic for processing authorization requests. For example, the authorization provider 230 may include a load balancer component that can dispatch requests to different instances based on load-balancing concerns. Other organization of handling requests at the authorization provider 230 may be implemented.

In some instances, an authorization server instances, such as the "Authorization Server Instance A" 235 may process the received redirect request. The authorization server instance authenticates the resource owner through the user agent 210 and establishes whether the resource owner can be granted or denied access right as requested (at 240).

In some instances, if the resource owner grants right to access the resource, the authorization server 235 can redirect (at 243) the user agent back to the client (at 244) using a redirection Uniform Resource Identifier (URI). The redirection URI can be an address location that can be provided with the request 242 or at another interactions, for example, upon registration of the client application 220 with the authorization provider 230. When the user agent 210 is redirected to the client application 220, an authorization code generated at the authorization server 235 is provided.

In some instances, the authorization server 235 may be include implemented logic to generate the authorization code in a self-contained format that may allow for a receiving party to validate the code without querying a database. For example, the authorization code may be as discussed above, in association to FIG. 1, and throughout this disclosure. The authorization code can be generated as a signed authorization code based on a generated public and private key pair. The authorization code can be generated as a signed version of a self-contained token that represents a string including information about the resource owner, for example, first name, last name, email, unique id, and other examples of identity information.

In some instances, the generated authorization code can be a JWT that provides a compact and self-contained way for securely transmitting information between parties as a JSON object. The authorization code may be signed and/or encrypted. The structure of an authorization code, such as the JWT with a signature, includes three parts: a header, a payload, and a signature. For example, a JWT usually has the following format: Header.Payload.Signature. The header may include information for the type of the code and the signing algorithm being used. The payload of the authorization code may include claims that include statements about an entity (e.g., the user) and additional data. To create the signature part of the code, a system can combine data including the encoded header, the encoded payload, and an identification of the algorithm to be specified in the header, with the system then signing that combination of data.

In some instances, the "Authorization Server Instance A" 235 may generate a key pair that is a unique key pair that can be managed in a way such that it can be used only once and discarded after being initially used to sign or verify the authorization code. In some instances, the "Authorization Server Instance A" 235 may generate the key pair at a key generator 232. In some other instances, the key pair can be generated at another instance of an authorization server, for example, a leader authorization server defined in a hierarchical organization of the server instances at the authorization provider 230. In some more instances, the key pair can be generated at a key generator managed by the authorization provide and outside of any of the instances.

In some instances, once the key pair is generated, the private key of the key pair can be used to sign the generated authorization code to generate the signed authorization code. The authorization code may be configured to be a single-use authorization code and the public key that can be used to verify the signed authorization code. In some instances, the public key can be configured to be dynamically deleted upon being fetched from one or more of the authorization server instances at the authorization provider 230 in response to validating a request to generate an access token based on a signed authorization code. In some instances, the private and the public key, even if generated at a separate server instance, may be used in such manner that, after a first usage, they can be deleted from any storage or space where they are located. For example, the private key can be used for signing the authorization code without ever being stored, or can be stored and then deleted once the signed authorization code is generated. In some instances, the public key can be maintained to serve for verifying of the authorization code, if the authorization code is used for issuing an access token within the validity period of the authorization code. In some instances, the public key may be stored only in-memory at one of the instances of the servers at the authorization provider. For example, a public key generated for a signed authorization code that is provided through 243 and 244 to the client application can be stored in-memory at the "Authorization Server Instance A" 235 that processed the request.

In some instances, the client application 220 receives the redirect request 244 and the signed authorization code and requests, at 245, an access token from one of the authorization server instances. The request 245 includes the signed authorization code. The authorization provider 230 may include implemented logic that may dispatch the received request to a particular one of the authorization server instances. In one example, the request 245 may be processed at the "Authorization Server Instance A" 235 as the instance that has been used for generating the signed authorization code. In some other instances, the request 245 may be processed by a different server instance to loan balance between the different server instances. In still other instances, the determination of which server instance can be used for processing the access token request can be based on a random selection.

In some instances, one of the authorization server instances processes the request based on the signed authorization code by determining where the public key for the signed authorization code is stored. For example, this determination may be performed through direct requests between the different instances to locate an instance that stores the public key. In some instances, once the public key is fetched, the public key can be deleted automatically, and the validation of the request for the access token can be processed based on the decrypted authorization code. In some other instances, a public key that matches the signed authorization code may not exist at any of the authorization server instances. In that case, the request to generate an access token can be rejected. For example, the reason for not being able to determine a public key that can be used to verify the signed authorization code may be that the public key has been already deleted as previously used for another request to generate an access token. In some instances, once an authorization code is decrypted, it can be determined whether the authorization code is still valid to serve for issuance of access tokens.

In some instances, once the authorization server from the multiple authorization servers authenticates the client application 220 and validates the authorization code, the authorization server can respond back to the client application 220 with an access token (245). In some instances, a refresh token can also be generated. In some examples, when the request 245 is processed, the authorization server can determine whether the redirected URI received to provide the access token matches a received URI used for the redirection at 244.

Figure 3:
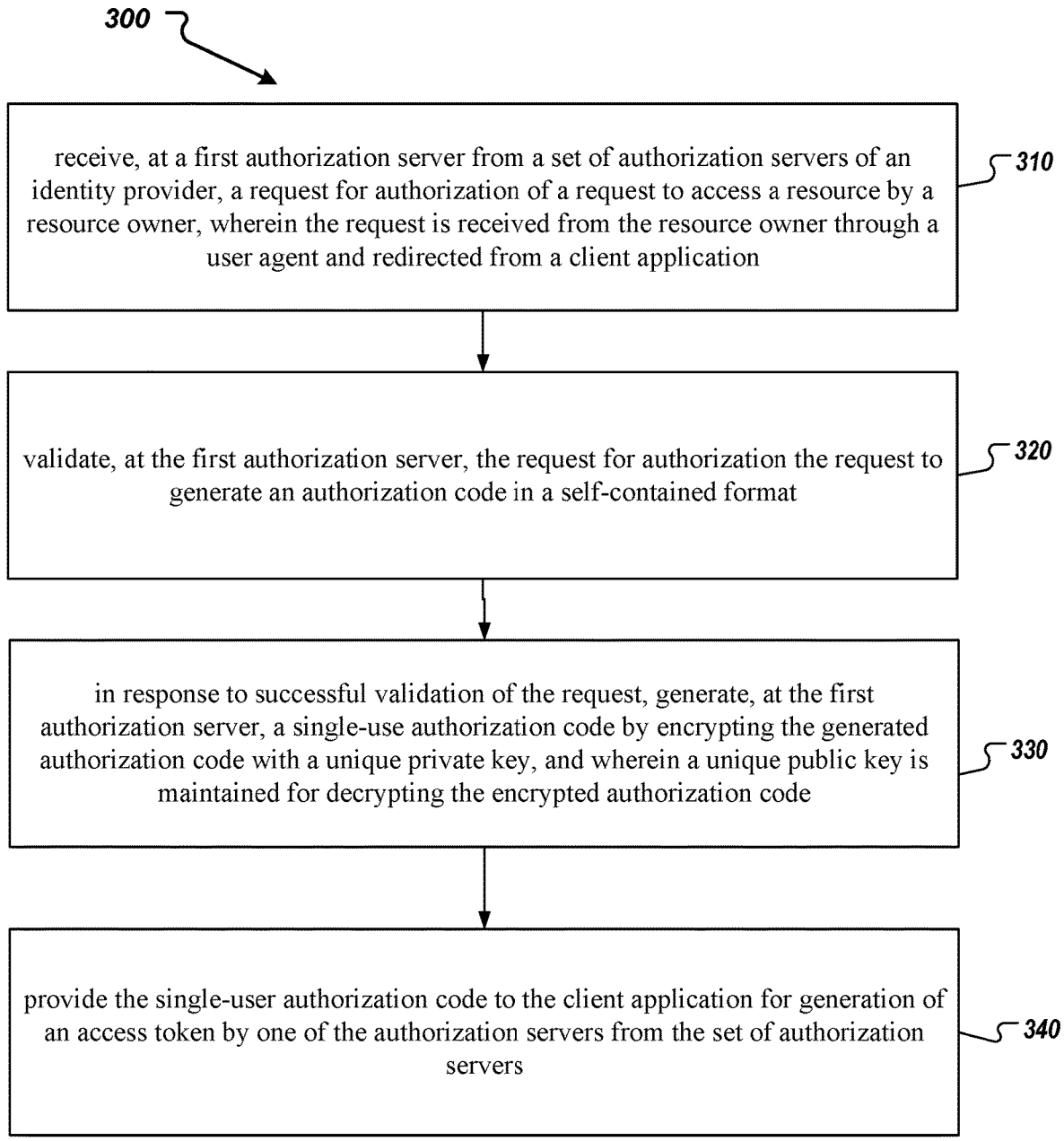
FIG. 3 is a flowchart for an example method for generating authorization codes in accordance with implementations of the present disclosure.

FIG. 3 is a flowchart for an example method 300 for generating authorization codes in accordance with implementations of the present disclosure.

The example method 300 may be performed at a system environment, such as the example system 100 of FIG. 1, or the example system 200 of FIG. 2. For example, the method 300 may be performed at one or more instances of the authorization servers of the authorization provider 230 of FIG. 2.

At 310, a request for authorization of a request to access a resource is received. In some cases, the request may be from a resource owner. The request is received at a first authorization server from a set of authorization servers of an identity provider. In some instances, the set of authorization instance may include multiple instances of one authorization server or multiple instances of different authorization servers, while in other instances, each authorization server instance may be distinct from one another. The request may be received in a process initiated by a resource owner to receive access to the resources through a user agent, where the request is sent to a client application. In some instances, when the request is sent by the user agent to the client, the client can redirect the authorization of the request to an authorization server from servers provided by an identity provider. The request may be received from the resource owner through the user agent and can be a redirected request from the client application. In some instances, the request at 310 may be received at "Authorization Server Instance A" 235 of FIG. 2.

At 320, the request for authorization of the request is validated at the first authorization server. The validation is performed to generate an authorization code in a self-contained format. In some instances, the authorization code may be as described above and through the present disclosure; for example, the authorization code may be in a JWT format.

At 330, in response to successful validation of the request for authorization by the resource owner, a single-use authorization code is generated at the first authorization server. The single-use authorization code is generated by signing the generated authorization code with a unique private key. The unique private key may be generated at the first authorization server, for example, at a key generator. The key generator may be as described for the key generator 232 of FIG. 2. In some instances, the unique private key is generated in associated with a unique public key to form a key pair that can be used for signing and verifying information. The unique public key can be maintained for decrypting the signed authorization code.

In some instances, both the unique private key and the unique public key may be stored in memory at the first authorization server. In some other instances, the unique private key may be dynamically deleted upon generation of the single-use authorization code. In some instances, once the unique public key is generated as a verification key for the unique private key, which is generated as an encrypting key to sign the authorization code, the unique public key is provided for storing in a key store. In some other instances, the unique private key and the unique public key are generated and stored at an authorization server different from the first authorization server, wherein the different authorization server is a leader server defined in an hierarchical organization for management of authorization servers for the identity provider.

At 340, the single-use authorization code is provided to the client application for generation of an access token by one of the authorization servers from the set of authorization servers. The access token is for use as access authorization to the resource from the client application. The access token is to be generated based on a validation performed at one or more of the authorization servers of the set of authorization servers of the identity providers and based on the unique public key. In some instances, the access token is generated based on validation performed by verifying the provided single-use authorization code by using the unique public key maintained by at least one of the authorization servers of the identity provider. In response to invoking the unique public key for validating the single-use authorization code, the unique public key can be dynamically deleted. Thus, if the single-use authorization code is used again, it cannot be validated as the verification key (i.e., the unique public key) would be deleted and cannot be invoked for decoding.

FIGS. 4, 5, 6, and 7 are flowcharts of example methods for generating authorization codes within an authorization provider environment including multiple authorization servers. In some instances, FIGS. 4, 5, 6, and 7 are different implementations of the authorization code generation as described in associated with system 200 of FIG. 2. In some instances, these flowcharts define alternative options for managing authorization code generation as described at FIGS. 1, 2, and 3, where the authorization code generation is dependent on the configuration and roles of the different authorization servers within the authorization provider environment. These figures are associated with a user agent and a client that can correspond to the user agent and client discussed for FIGS. 1, 2, and 3. These figures are associated with generation of authorization codes based on unique public-private keys that are generated and managed in a way to support single-use of the authorization codes that are in a self-contained format, as discussed in disclosure of FIGS. 1, 2, and/or 3.

Figure 4:
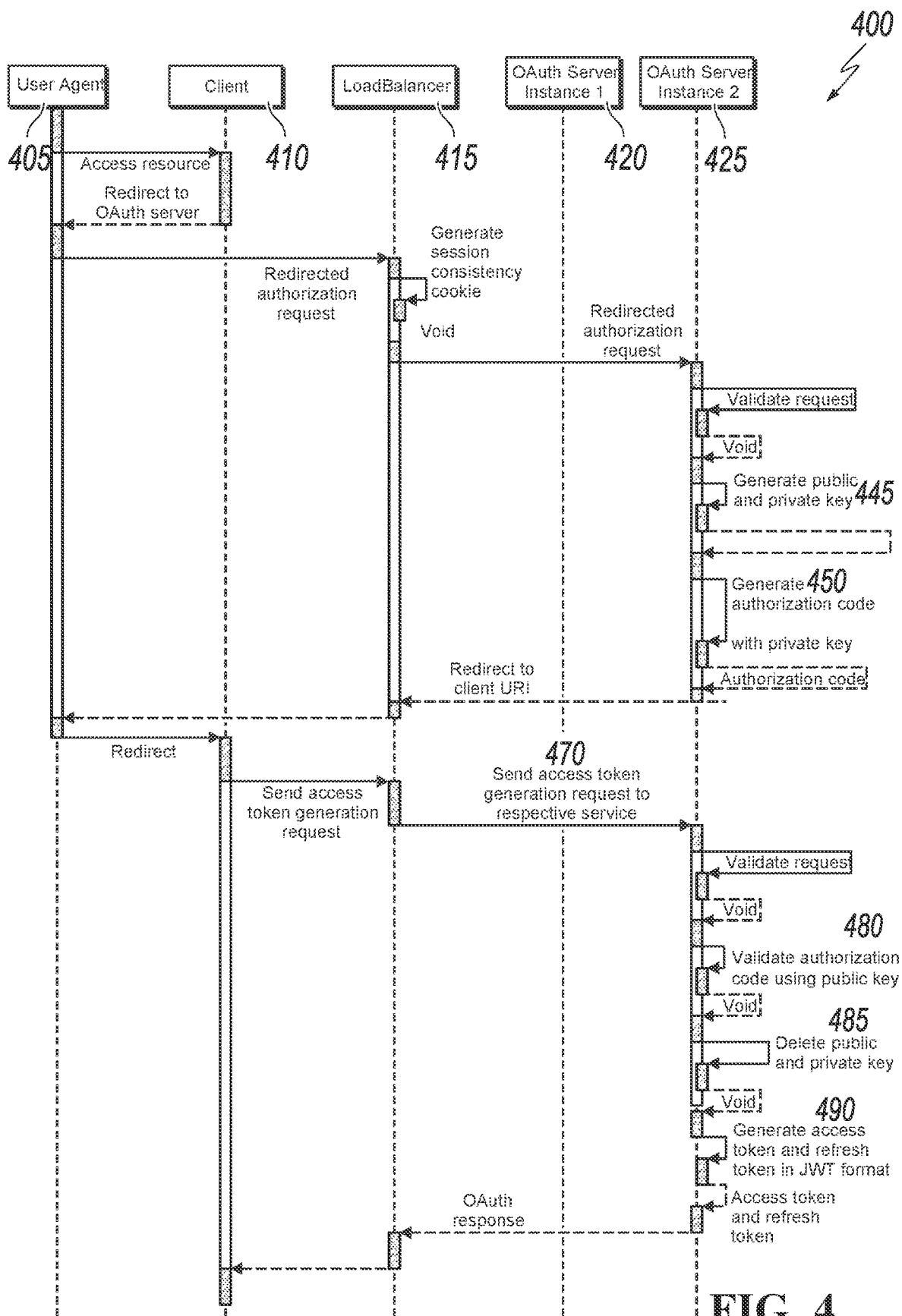
FIG. 4 is a flowchart for an example method for generating authorization codes at authorization servers managed by a load balancer in accordance with implementations of the present disclosure.

FIG. 4 is a flowchart for an example method 400 for generating authorization codes at authorization servers managed by a load balancer in accordance with implementations of the present disclosure. The example method 400 is implemented in relation to an authorization provider environment that includes a load balancer 415 and two instances of authorization servers 420 and 425. The load balancer 415 manages the received requests from a user agent 405 in relation to authorization requests to generate authorization codes as single-use self-contained tokens, and to generate access tokens and other types of security tokens (e.g., refresh tokens).

In some instances, the method 400 is for generation of access tokens based on signed authorization codes. The generation of the signed authorization codes and the subsequent access tokens is performed by an authorization server instance from instances 420 and 425. In some instances, the client 410 initiates the authorization flow by directing the user agent 405 of the resource owner to an authorization endpoint, where the authorization endpoint is determined by the load balancer 415. In some instances, the client 410 can includes its client identifier, requested scope, local state, and a redirection URI to which the authorization server can send the user agent back to once access is granted or denied.

In some instances, the load balancer 425 may include logic to provide a reverse proxy capability that enables generation and management of session consistency cookies. If the load balancer 425 does not include logic to handle session consistency cookies, the authorization server instances 420 and 425 may support the generation and the management of session consistency cookies to track requests received from the user agent 405, and redirect those requests to one of the authorization servers through the load balancer 415.

At 440, the load balancer 415 redirects the authorization request to the "Authorization Server Instance 2" 425. The load balancer 415 routes the request to that authorization server instance 425 and generates a session consistency cookie. At 445, the "Authorization Server Instance 2" 425 generates a new public and private key pair for signature. At 445, the "Authorization Server Instance 2" 425 may store the newly-generated public and private keys at an in-memory storage. At 450, the "Authorization Server Instance 2" 425 generates a signature using the newly-generated private key to generate the authorization code in an encrypted form (e.g., in a JWT signed format). Thus, the "Authorization Server Instance 2" 425 generates a signed authorization code as discussed, for example, at FIGS. 1, 2, and 3.

In some instances, during the access token generation request process, the load balancer 415 can route the client 410 to the "Authorization Server Instance 2" 425 based on the session consistency cookie.

Figure 5:
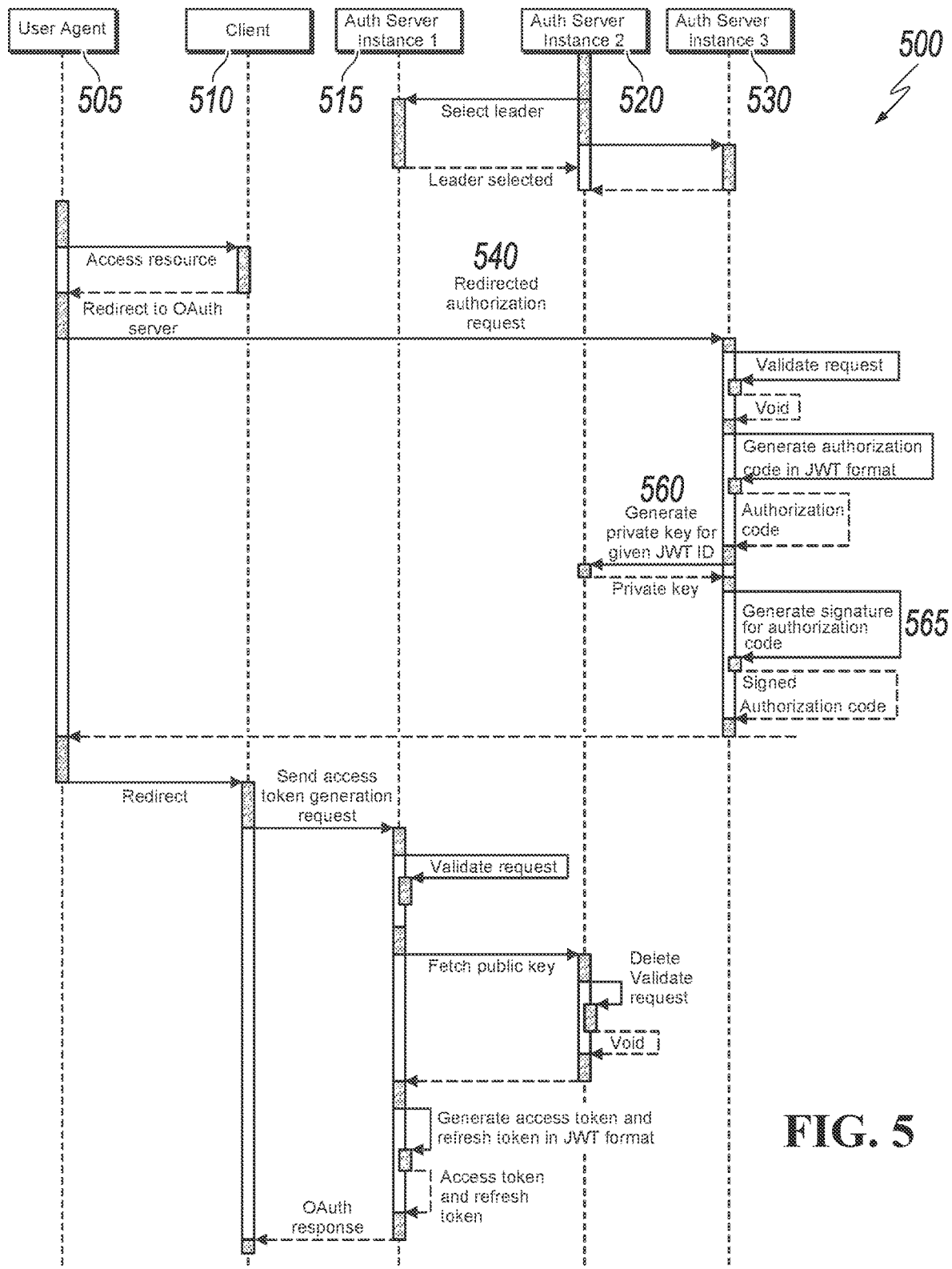
FIG. 5 is a flowchart for an example method for generating authorization codes at authorization servers organized in a hierarchical manner in accordance with implementations of the present disclosure.

In some instances, when the "Authorization Server Instance 2" 425 receives a request (at 470) to generate an access token based on a respective service and corresponding signed authorization code, the "Authorization Server Instance 2" 425 may use the previously-generated public key to verify the signature (at 480). At 485, the "Authorization Server Instance 2" 425 may delete the previously-generated public and private keys. At 490, the "Authorization Server Instance 2" 425 generates an access token and/or a refresh token. For example, the access token and/or the refresh token can be self-contained tokens. In particular, the access token and/or the refresh token can be in JWT format. FIG. 5 is a flowchart for an example method 500 for generating authorization codes at authorization servers organized in a hierarchical manner in accordance with implementations of the present disclosure. The example method 500 is implemented in relation to an authorization provider environment that includes a user agent 505, a client 510, three two instances of authorization servers—authorization servers 515, 520, and 525.

The example method 500 is another approach of handling request for generation of authorization codes that may be an alternative of the method described at FIG. 4. The generation of authorization codes according to method 500 is implemented in an authorization server environment, where the different server nodes are organized in an hierarchical manner, and where one of the servers is designated as lead or master node (e.g., by using the Raft consensus algorithm). The authorization server that is defined as the lead node may be responsible for the generation and the storing of all newly generated public and private keys associated with generation of authorization codes. In some instances, the "Authorization Server Instance 2" 520 is determined as a selected lead server.

At 540, a request for authorization of a request for resources is redirected to one of the authorization servers, here illustrated as "Authorization Server Instance 3" 530, from multiple authorization servers of an authorization server provider. Then, as the request is received at a secondary server node rather than at the lead node, the "Authorization Server Instance 3" 530 initiates the validation of the request and generates an initial authorization code in a self-contained format.

At 560, the "Authorization Server Instance 3" 530 inquires the leader node to generate a new public and private key pair. In some instances, if the request 540 is received at a leader node rather than at a secondary node, the request 540 can be processed by the leader node, and no communication between server nodes may be necessary.

At 565, the secondary node 530 generates a signature using the fetched private key.

Figure 6:
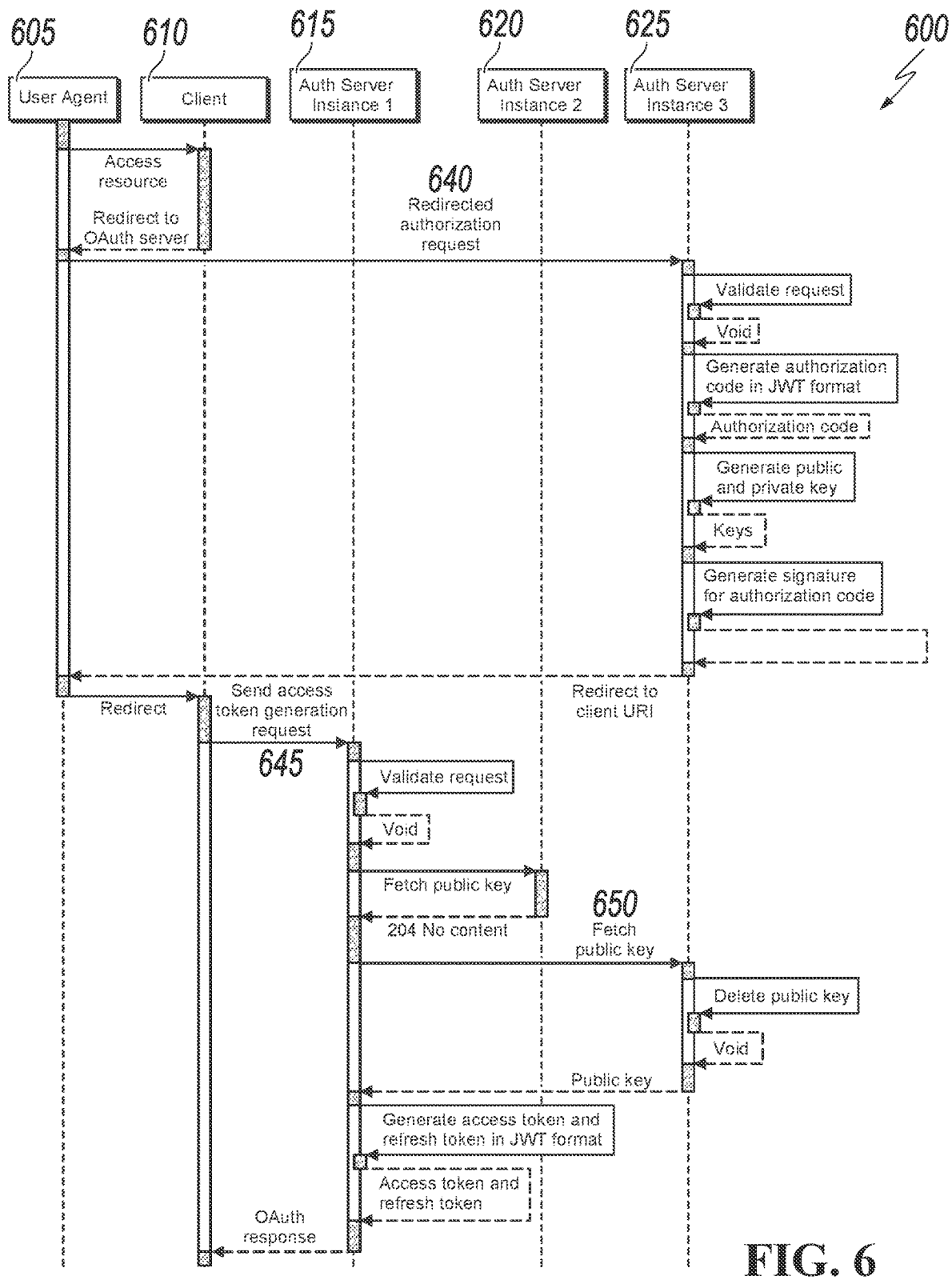
FIG. 6 is a flowchart for an example method for generating authorization codes at authorization servers managed in a non-consensual organization in accordance with implementations of the present disclosure.

During an access token generation based on an authorization code generated within such a hierarchical setup, if the request to generate the access token is not directed to the leader node, the slave node can ask the master node for the public key associated for this authorization code and verify the signed authorization code based on the fetched public key. In some instances, this master node can delete the previously generated public and private keys, once the verification is done. In some other instances, the private key may not be stored at all, and the public key can be automatically deleted once fetched from the master node. In some instances, the generation of the access token and the process for requesting it and acquiring it may be performed similar to the processes described in FIG. 4. FIG. 6 is a flowchart for an example method 600 for generating authorization codes at authorization servers managed in a non-consensual organization in accordance with implementations of the present disclosure. The example method 600 is implemented in relation to an authorization provider environment that includes a user agent 605, a client 610, and three instances of authorization servers—authorization servers 615, 620, and 625.

The example method 600 is an alternative approach of handling requests for generation of authorization codes as compared to the methods described at FIGS. 4 and/or 5. The generation of authorization codes according to method 600 is implemented in an authorization server environment, where the server nodes (i.e., the authorization servers) are defined in a non-consensual organization within the architecture of the authorization provider environment.

In some instances, in a non-consensual organization design of authorization service nodes to handle requests for generation of authorization codes, each of the nodes can generate and maintain public and private key pairs. In some instances, every node can be queried from other nodes to fetch a public key to verify a signed version of an authorization code.

In some instances, when an authorization code generation request is received at one of the server instances of the plurality authorization server, a new public and private key pair is generated and stored in-memory on a particular instance machine (e.g., virtual machine) where the authorization server instance is running. For example, the request 640 is received at the "Authorization Server Instance 3" 625. The "Authorization Server Instance 3" 625 generates an authorization code and a signature based on a generated private key. The generated private key and a corresponding public key are maintained in-memory, rather than at a persistent storage.

At 645, when an access token generation request is received by an authorization server node different than the one used to generate the public key for verification of the signed authorization code, the receiving server instance 615 may fetch the public key from one of the other server nodes in order to verify the authorization code's signature. As the receiving server instance 615 does not know which one of the server nodes generated the signed authorization code, the receiving server instance 615 may perform one or more inquiries to determine the public key's location and to fetch the key. Once the public key is fetched (at 650), the public key is instructed to be deleted or is automatically deleted based on implemented logic of the storing authorization server instances. In some instances, once the public key is fetched, an access token can be generated at the server instances 615 and provided to the client 610. The generation of the access token can be similar to the discussed access token generation of FIGS. 4 and/or 5.

Figure 7:
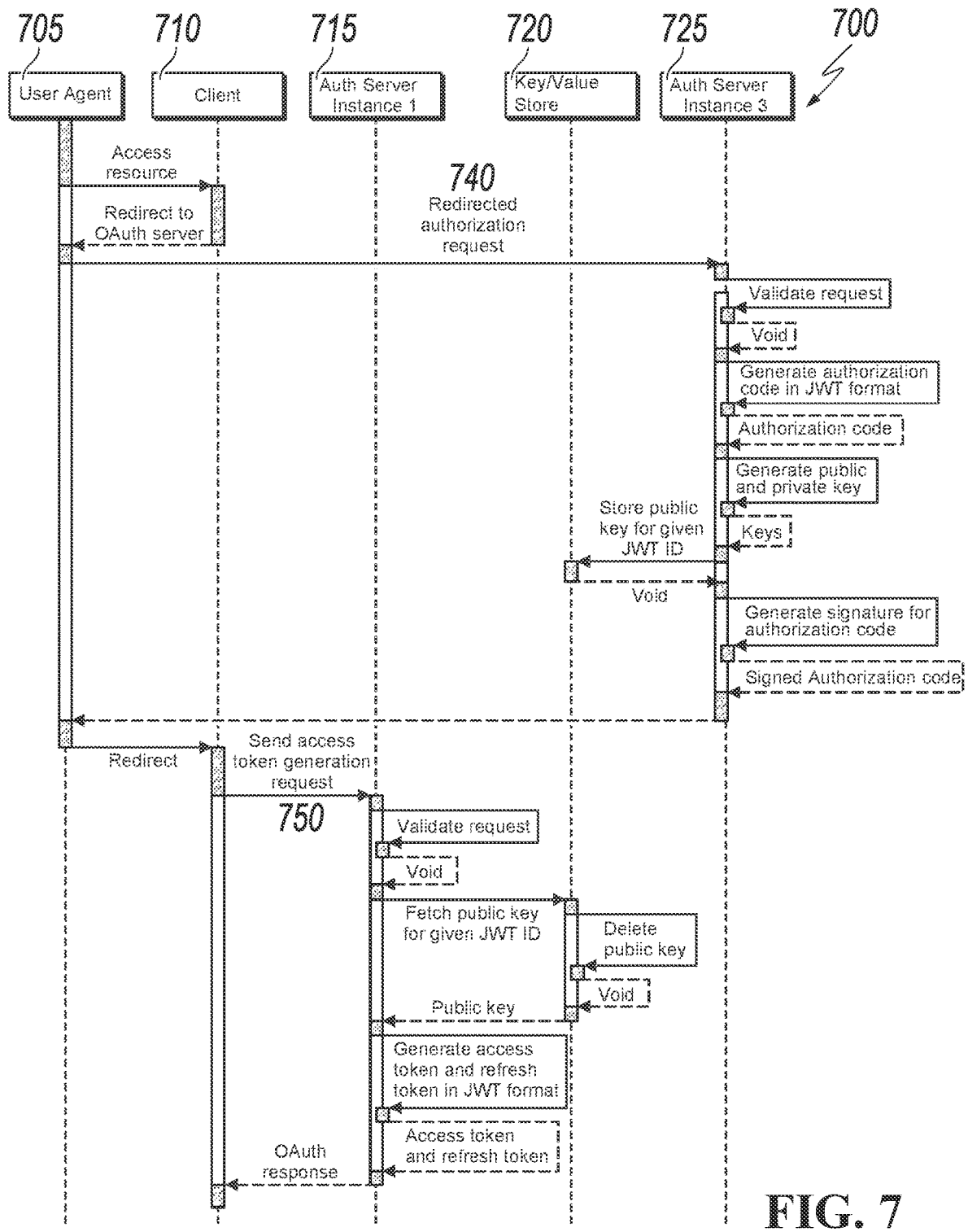
FIG. 7 is a flowchart for an example method for generating authorization codes at authorization servers in accordance with implementations of the present disclosure.

FIG. 7 is a flowchart for an example method 700 for generating authorization codes at authorization servers in accordance with implementations of the present disclosure. The example method 700 is implemented in relation to an authorization provider environment that includes a user agent 705, a client 710, and two instances of authorization servers—authorization servers 715 and 725, and a key/value store 720.

The example method 700 is another alternative approach of handling request for generation of authorization codes as compared to methods described at FIGS. 4, 5, and/or 6. The generation of authorization codes according to method 700 is implemented in an authorization server environment, where the server nodes (the authorization servers) are defined in a non-consensual organization within the architecture of the authorization provider environment. The authorization servers part of the authorization provider environment may use a key/value store 720 for storing private and/or public keys related to generation of authorization codes as described above in association to FIGS. 1, 2, and/or 3.

In some instances, the public and private key associated with a generated authorization code may be shared between authorization server nodes (i.e., "Authorization Server Instance 1" 715 and "Authorization Server Instance 2" 725) by using an additional component that can act as key store (i.e., key/value store 720) for managing private-public key pair storages.

In some instances, the key/value store 720 stores a mapping between keys and values. For example, the key/value store 720 can store a key and a value for verification operations. In some instances, a first record at the key/value store 720 may include as an identifier that uniquely identifies a signed authorization code as a key and a public key for verifying the signed authorization code as a corresponding value to the key. For example, a unique authorization code identifier part of the payload of the authorization code may be used as the identifier to provide a mapping between an authorization code and a public key.

In some instances, at 750, when an authorization requests is redirected to one of the authorization servers (i.e., the "Authorization Server Instance 2" 725), the authorization code is generated based on a new public and private key that are generated at the same authorization server. In some instances, the private key can be used to generate a signature for the authorization code (e.g., in JWT format).

In some instances, the public key can be stored in the key/value store 720. In some instances, the public key can be mapped to an identifier for the generated authorization code. In some instances, the user agent receives a redirect response from the "Authorization Server Instance 3" 725 that includes a generated signed authorization code. The generation of the signed authorization code may be similar to the discussed generation of signed authorization code at FIGS. 2, 3, 4, 5, and/or 6.

In some instances, once the user agent 705 receives the redirect response with the signed authorization code, the user agent 705 sends a request to the client 710 to request (750) from an instance authorization server to generate an access token. In some instances, during processing of the access token generation request 750, the public key is fetched from the key/value store 720. Based on the fetched public key, the authorization code provided with the request 750 can be verified. In some instances, the key/value store 720 may be configured to automatically delete the public key from the key/value store once it is fetched to validate a request associated with a corresponding signed authorization code.

Figure 8:
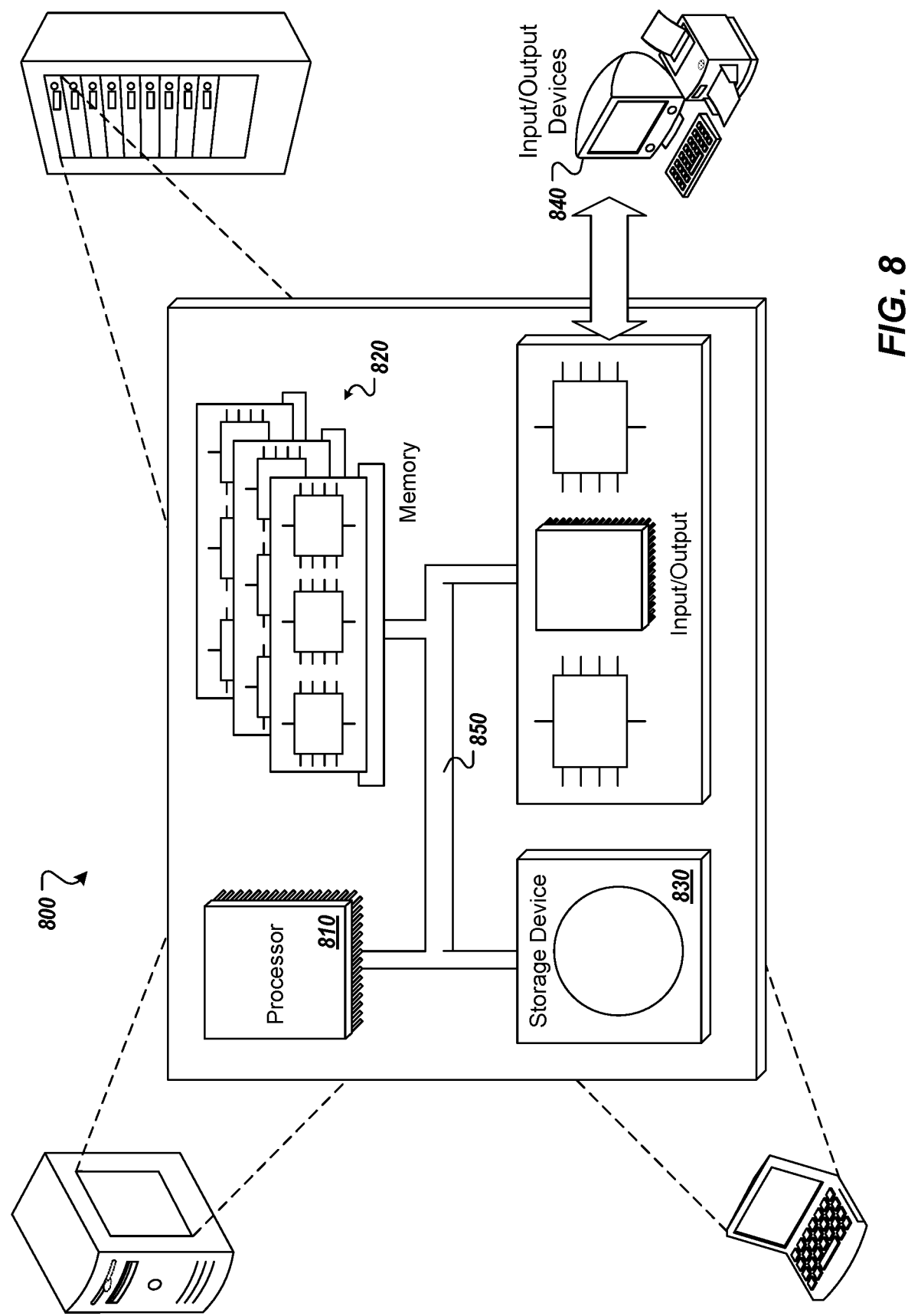
FIG. 8 is a schematic illustration of example computer systems that can be used to execute implementations of the present disclosure.

Referring now to FIG. 8, a schematic diagram of an example computing system 800 is provided. The system 800 can be used for the operations described in association with the implementations described herein. For example, the system 800 may be included in any or all of the server components discussed herein. The system 800 includes a processor 810, a memory 820, a storage device 830, and an input/output device 840. The components 810, 820, 830, 840 are interconnected using a system bus 850. The processor 810 is capable of processing instructions for execution within the system 800. In some implementations, the processor 810 is a single-threaded processor. In some implementations, the processor 810 is a multi-threaded processor. The processor 810 is capable of processing instructions stored in the memory 820 or on the storage device 830 to display graphical information for a user interface on the input/output device 840.

The memory 820 stores information within the system 800. In some implementations, the memory 820 is a computer-readable medium. In some implementations, the memory 820 is a volatile memory unit. In some implementations, the memory 820 is a non-volatile memory unit. The storage device 830 is capable of providing mass storage for the system 800. In some implementations, the storage device 830 is a computer-readable medium. In some implementations, the storage device 830 may be a floppy disk device, a hard disk device, an optical disk device, or a tape device. The input/output device 840 provides input/output operations for the system 800. In some implementations, the input/output device 840 includes a keyboard and/or pointing device. In some implementations, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machinereadable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system, including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, application-specific integrated circuits (ASICs).

To provide for interaction with a user, the features can be implemented on a computer having a display device, such as a cathode ray tube (CRT) or liquid crystal display (LCD) monitor for displaying information to the user and a keyboard and a pointing device, such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication, such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

In view of the above described implementations of subject matter this application discloses the following list of examples, wherein one feature of an example in isolation or more than one feature of said example taken in combination and, optionally, in combination with one or more features of one or more further examples are further examples also falling within the disclosure of this application.

Example 1. A computer-implemented method comprising: receiving, at a first authorization server from a set of authorization servers of an identity provider, a request for authorization of a request to access a resource by a resource owner, wherein the request is received through a user agent that sends a redirect request to a client application to be redirected to the first authorization server; validating, at the first authorization server, the request for authorization the request to generate an authorization code; in response to successful validation of the request for authorization to generate the authorization code, generating, at the first authorization server, a single-use authorization code by signing the generated authorization code with a unique private key, and wherein a unique public key is maintained for verifying the signed authorization code, wherein the single-use authorization code is generated in a self-contained format; and providing the single-use authorization code to the client application for generation of an access token by one of the authorization servers from the set of authorization servers, wherein the access token is for access authorization to the resource from the client application, wherein the access token is to be generated based on a validation performed at one or more of the authorization servers of the set of authorization servers of the identity providers and based on the unique public key, wherein in response to invoking the unique public key for validating the single-use authorization code, the unique public key is dynamically deleted.

Example 2. The method of Example 1, wherein the unique private key is stored in-memory at the first authorization server.

Example 3. The method of Examples 1 or 2, wherein the unique public key is stored in-memory at an authorization server from the plurality of authorization servers that is defined as a leader server in an hierarchical organization of the set of authorization servers of the identity provider.

Example 4: The method of Examples 1, 2, or 3, wherein the unique private key is not maintained in data storage associated with the identity provider.

Example 5: The method of Examples 1, 2, 3, or 4, wherein the unique public key is stored at a shared key store accessible by the plurality authorization servers of the identity provider, wherein the shared key store is not shared external to the plurality of authorization servers of the identity provider.

Example 6: The method of Examples 1, 2, 3, 4, or 5, further comprising: generating, at the first authorization server, a unique key pair including the unique public key and the unique private key, wherein the unique key pair is generated in association with the authorization code; and in response to generation of the single-use authorization code, dynamically deleting the unique private key.

Example 7: The method of Examples 1, 2, 3, 4, 5, 6, of 7, wherein the authorization code is in a JSON Web Token format.

Example 8: The method Examples 1, 2, 3, 4, 5, 6, 7, or 8, further comprising, in response to receiving an access token generation request based on the single-use authorization code at the first authorization server: validating the single-use authorization code based on the unique public key, and dynamically deleting the unique public key.

Example 9: The method of Example 8, wherein the access token generation request is directed to an instance of an authorization server that is associated with the generation of the single-use authorization code, and wherein the first authorization server is determined for directing the access token generation requests based on a generated session consistency identifier, wherein the session consistency identifier is generated at a load balancer implemented at the identity provider, the load balancer dispatches requests including requests for generating authorization codes and access token.

Example 10: The method of Examples 1, 2, 3, 4, 5, 6, 7, 8, or 9, wherein the request for authorization of the request to access the resource by the resource owner is a redirected request from the client application, wherein the client application initially received a request from the resource owner through the user agent for the resource.

Similar operations and processes as describes in Examples 1 to 10 may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations as describes in any one of the Examples 1 to 10 may also be contemplated.

What is claimed is:

1. A computer implemented method for generating authorization codes at a set of authorization servers, wherein the set of authorization servers are organized to process requests for accessing resources and generate access tokens according to a non-consensual organization, where each authorization server is assigned the same right and role, the method comprising:
receiving, from a client application and at a second authorization server, a request including an authorization code for requesting access to a resource by a client application, wherein the authorization code is signed with a signature that is generated based on a private key generated at a first authorization server of the set of authorization servers, wherein each authorization server of the set of authorization servers is configured to generate and maintain a respective pair of a public key and a private key;
in response to receiving the request, generating, at the second authorization server, an access token based on verifying the signature of the authorization code, wherein verifying the access token comprises:
querying other authorization servers of the set of authorization servers to determine that the first authorization server had signed the authorization code; and
fetching a generated public key maintained at the first authorization server to verify the signature of the authorization code; and
providing the access token to the client application to access the resource.

2. The method of claim 1, wherein the first authorization server generates the private key and the corresponding public key that are maintained in-memory at the first authorization server.

3. The method of claim 1, comprising:
in response to fetching the public key, sending an instruction from the second authorization server to the first authorization server to delete the public key and the private key as maintained at the first authorization server.

4. The method of claim 1, comprising:
in response to providing the public key to the second authorization server, automatically determining by the first authorization server to delete the public key and the private key.

5. The method of claim 1, wherein providing the access token comprises:
in response to receiving the access token generation request and obtaining the public key at the second authorization server, generating the access token to be provided to the client application.

6. The method of claim 1, wherein the authorization code is generated as a single-use authorization code by signing the generated authorization code with a unique private key as the private key, and wherein the public key used for verifying the authorization code is an unique public key maintained for verifying the signed authorization code at the first authorization server.

7. The method of claim 1, wherein the authorization code is used as a single-use authorization code generated in a self-contained format.

8. The method of claim 1, comprising:
generating, at the first authorization server, a unique key pair including the public key as a unique public key and the private key as a unique private key, wherein the unique key pair is generated in association with the authorization code.

9. A non-transitory, computer-readable medium coupled to one or more processors and having instructions stored thereon which, when executed by the one or more processors, cause the one or more processors to perform operations, the operations comprising:
receiving, from a client application and at a second authorization server, a request including an authorization code for requesting access to a resource by a client application, wherein the authorization code is signed with a signature that is generated based on a private key generated at a first authorization server of a set of authorization servers, wherein each authorization server of the set of authorization servers is configured to generate and maintain a respective pair of a public key and a private key, wherein the set of authorization servers are organized to process requests for accessing resources and generate access tokens according to a non-consensual organization, where each authorization server is assigned the same right and role;
in response to receiving the request, generating, at the second authorization server, an access token based on verifying the signature of the authorization code, wherein verifying the access token comprises:
querying other authorization servers of the set of authorization servers to determine that the first authorization server had signed the authorization code; and fetching a generated public key maintained at the first authorization server to verify the signature of the authorization code; and providing the access token to the client application to access the resource.

10. The computer-readable medium of claim 9, wherein the first authorization server generates the private key and the corresponding public key that are maintained in-memory at the first authorization server.

11. The computer-readable medium of claim 9, wherein the operations further comprise:

in response to fetching the public key, sending an instruction from the second authorization server to the first authorization server to delete the public key and the private key as maintained at the first authorization server.

12. The computer-readable medium of claim 9, wherein providing the access token further comprise:

in response to providing the public key to the second authorization server, automatically determining by the first authorization server to delete the public key and the private key.

13. A system comprising:

a computing device; and a computer-readable storage device coupled to the computing device and having instructions stored thereon which, when executed by the computing device, cause the computing device to perform operations, the operations comprising:

receiving, from a client application and at a second authorization server, a request including an authorization code for requesting access to a resource by a client application, wherein the authorization code is signed with a signature that is generated based on a private key generated at a first authorization server of a set of authorization servers, wherein each authorization server of the set of authorization servers is configured to generate and maintain a respective pair of a public key and a private key, wherein the set of authorization servers are organized to process requests for accessing resources and generate access tokens according to a non-consensual organization, where each authorization server is assigned the same right and role;

in response to receiving the request, generating, at the second authorization server, an access token based on verifying the signature of the authorization code, wherein verifying the access token comprises:

querying other authorization servers of the set of authorization servers to determine that the first authorization server had signed the authorization code; and fetching a generated public key maintained at the first authorization server to verify the signature of the authorization code; and providing the access token to the client application to access the resource.

14. The system of claim 13, wherein the first authorization server generates the private key and the corresponding public key that are maintained in-memory at the first authorization server.

15. The system of claim 13, wherein the system further comprises instructions which when executed cause the computing device to perform operations comprising:

in response to fetching the public key, sending an instruction from the second authorization server to the first authorization server to delete the public key and the private key as maintained at the first authorization server.

16. The system of claim 13, wherein providing the access token comprises:

in response to providing the public key to the second authorization server, automatically determining by the first authorization server to delete the public key and the private key.

* * * * *